United States Patent
Janes

(10) Patent No.: US 9,443,329 B2
(45) Date of Patent: Sep. 13, 2016

(54) SYSTEMS AND METHODS FOR GRAPHIC VISUALIZATION OF VENTRICLE WALL MOTION

(71) Applicant: Siemens Medical Solutions USA, Inc., Malvern, PA (US)

(72) Inventor: David Janes, Rolling Meadows, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 148 days.

(21) Appl. No.: 14/296,955

(22) Filed: Jun. 5, 2014

(65) Prior Publication Data

US 2015/0356750 A1 Dec. 10, 2015

(51) Int. Cl.
*G06K 9/00* (2006.01)
*G06T 11/00* (2006.01)

(52) U.S. Cl.
CPC .... *G06T 11/001* (2013.01); *G06T 2207/30048* (2013.01)

(58) Field of Classification Search
CPC ................ G06T 2207/30048; G06T 7/0012; G06T 7/0083; G06T 11/00; G06T 7/00; G06T 11/60
See application file for complete search history.

(56) References Cited

U.S. PATENT DOCUMENTS

| | | | | |
|---|---|---|---|---|
| 6,404,432 B1* | 6/2002 | Simpson | ................ | G06T 11/40 345/440 |
| 2003/0160786 A1* | 8/2003 | Johnson | ................ | G06T 17/20 345/419 |
| 2008/0281218 A1* | 11/2008 | Lei | ................ | A61B 6/503 600/523 |
| 2009/0105578 A1* | 4/2009 | Qu | ................ | A61B 6/4441 600/407 |
| 2009/0122082 A1* | 5/2009 | Heron | ................ | G06T 7/0012 345/629 |
| 2010/0074475 A1* | 3/2010 | Chouno | ................ | A61B 5/055 382/107 |
| 2011/0243401 A1* | 10/2011 | Zabair | ................ | G06K 9/00 382/128 |
| 2012/0330557 A1 | 12/2012 | Zhang et al. | | |

* cited by examiner

*Primary Examiner* — Amara Abdi

(57) ABSTRACT

A method for graphic visualization of ventricle wall motion includes acquiring medical imaging data frames depicting at least one cardiac cycle, identifying a ventricle wall outline in at least a portion of the plurality of image frames, determining end systolic and end diastolic frames belonging to a same cardiac cycle, copying the ventricle wall outline image from the ES and the ED frames, creating a composite image frame that includes the copied ventricle wall outline images, assigning a first color to the ES and a second color to the ED outline images of the composite frame, and providing the composite frame for displaying, printing, and/or storing in memory. A system for implementing the method and a non-transitory computer-readable medium are also disclosed.

21 Claims, 8 Drawing Sheets

SYSTEMS AND METHODS FOR GRAPHIC VISUALIZATION OF VENTRICLE WALL MOTION

BACKGROUND

Digital medical images of a heart are acquired and analyzed to perform cardiac ventricle analysis. Each of these images can be a collection of frames which show the heart as it beats. As the heart transitions from systolic phase to diastolic phase, there is a visible change to the ventricle wall in each frame.

DETAILED DESCRIPTION

In accordance with embodiments, graphic visualization of the motion of a ventricle wall is provided by introducing a changing color in a collection of outlines of the ventricle wall in each frame of a multi-frame image as the heart transitions between systolic and diastolic phases. In accordance with some implementations, the End Diastolic (ED) frame and the End Systolic (ES) frame for a particular cardiac cycle can be identified from a series of frames obtained by a medical imaging system. The ventricle wall outline can be identified in image frames of the cardiac cycle, and a composite frame of the series of images can be formed. By introducing a graphic visualization into the composite frame, the ventricle wall motion for a single heart beat (i.e., from ES to ED frame) can be displayed.

Figure 1:
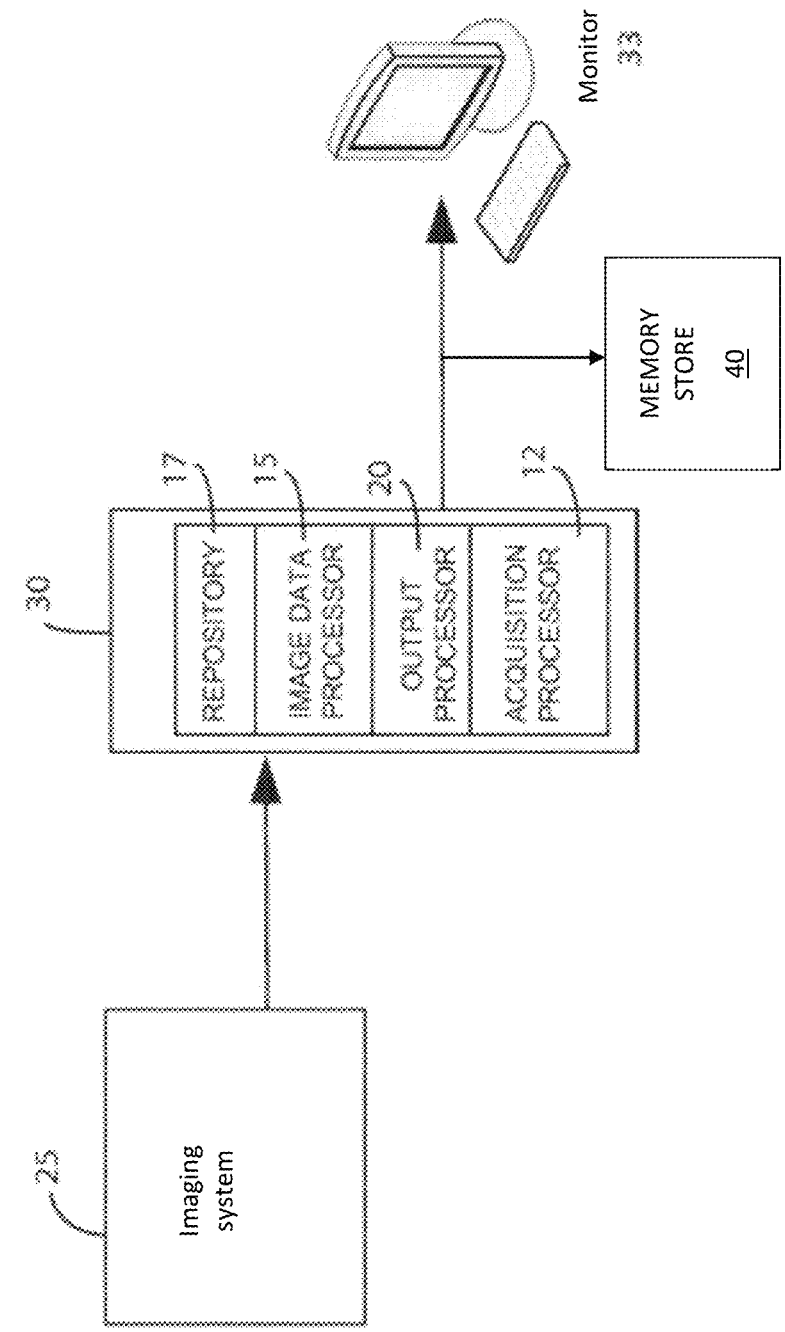
FIG. 1 depicts a system in accordance with some embodiments.

FIG. 1 depicts system 10 for providing a composite, graphically-enhanced image of ventricle wall motion in accordance with some embodiments. This composite graphically-enhanced image can be displayed on monitor 33, printed, and/or stored in memory store 40 for later access.

System 10 employs at least one processing device 30 for processing images acquired by imaging system 25 for display on monitor 33. Specifically, processing device 30 comprises at least one computer, server, microprocessor, programmed logic device, ASIC, FPGA, or other processing device comprising repository 17, image data processor 15, output processor 20 and acquisition processor 12. Acquisition processor 12 acquires medical images from imaging system 25. Imaging system 25 can be a medical imaging system of any type or nature—such as an MR, X-ray, CT scan or ultrasound imaging system.

Figure 2:
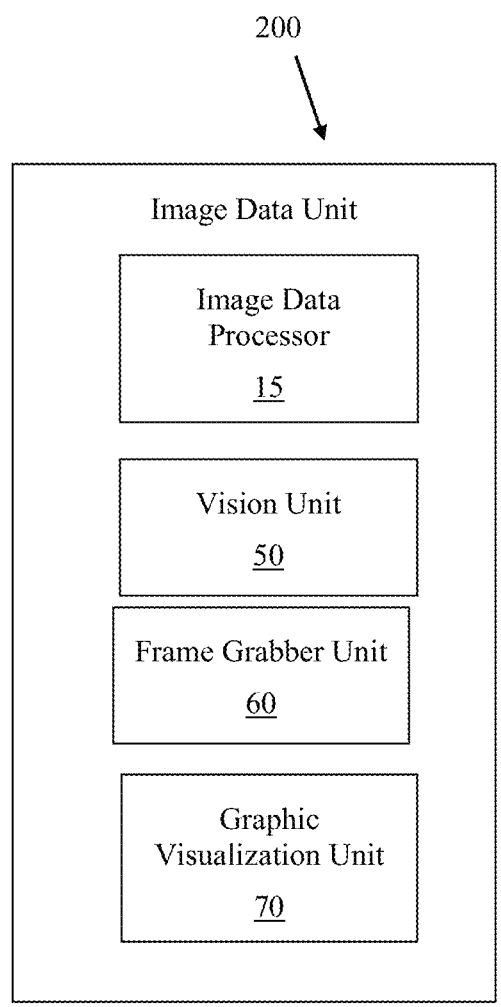
FIG. 2 depicts an imaging data unit in accordance with the system depicted in FIG. 1.

FIG. 2 depicts an imaging data unit 200 in accordance with some embodiments. The imaging data unit can include image data processor 15, vision unit 50, and frame grabber unit 60. Vision unit 50 is structured to identify the ventricle wall outline of a heart in the frames of the acquired medical images. In accordance with implementations, these frames can be consecutive frames, sequentially sampled (ordered but not consecutive) or not ordered at all. The vision unit can identify which are the ED frame and the ES frame, and those intermediary frames which occur between the ED and ES frames. In accordance with some implementations, the ED and ES frames can be identified by correlating the image frame with an ECG waveform taken simultaneously with the imaging data. In other implementations, the frames can be manually identified.

Frame grabber unit 60 is structured to isolate and copy at least a portion of the image from each frame identified by the vision unit. In particular, the frame grabber unit isolates and copies the outline of the ventricle wall perimeter from the frames of the same cardiac cycle that includes the identified ES and ED frames. In some implementations, the ventricle wall perimeter can be manually identified by a user marking the heart's apex and two points of the aorta. The isolated ventricle wall outlines can be superimposed together to create a composite frame that includes the removed ventricle wall perimeters. This superimposed composite frame can visualize the motion of the ventricle wall in one image. In accordance with some embodiments, this superimposed composite frame can include graphical visualization that indicates the movement of the ventricle wall as the wall transitions between the systolic and diastolic phases. With reference to FIG. 1, output processor 20 outputs the composite image for display on monitor 33, and/or storage into memory store 40.

Figure 3A:
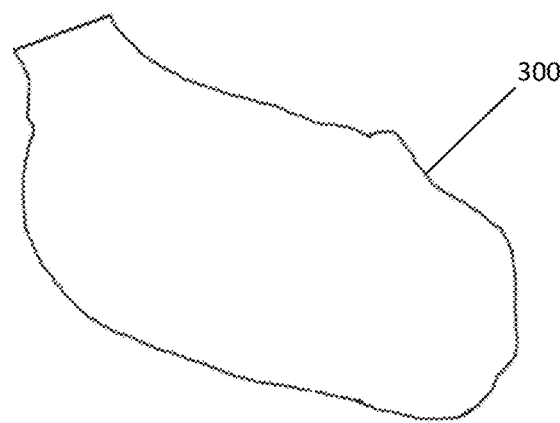
FIGS. 3A-3D depict ventricle wall outline image frame grabs in accordance with some embodiments.
Figure 3B:
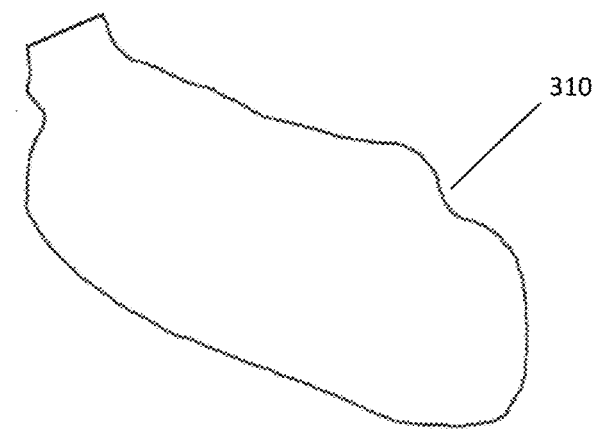
Figure 3C:
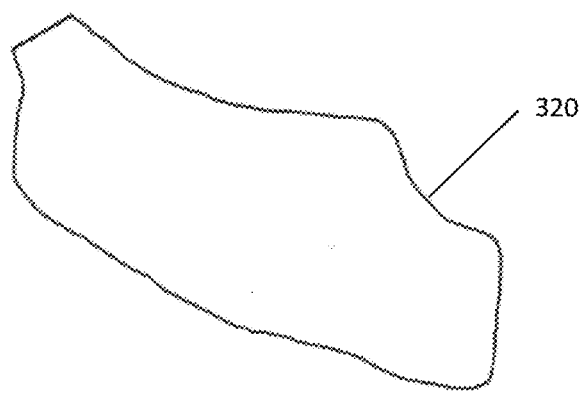
Figure 3D:
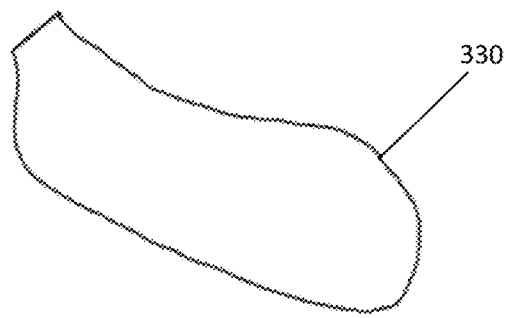

FIG. 3A depicts a ventricle wall outline image frame grab 300 for an ED frame. Similarly, FIG. 3D depicts a ventricle wall outline image frame grab 330 for an ES frame. FIGS. 3B and 3C depict ventricle outline image frame grabs 310, 320 for frames between the ED and ES frames. Each of the frames depicted in FIGS. 3A-3D can be identified by vision unit 50 and isolated by frame grabber unit 60 in accordance with some embodiments.

Figure 4:
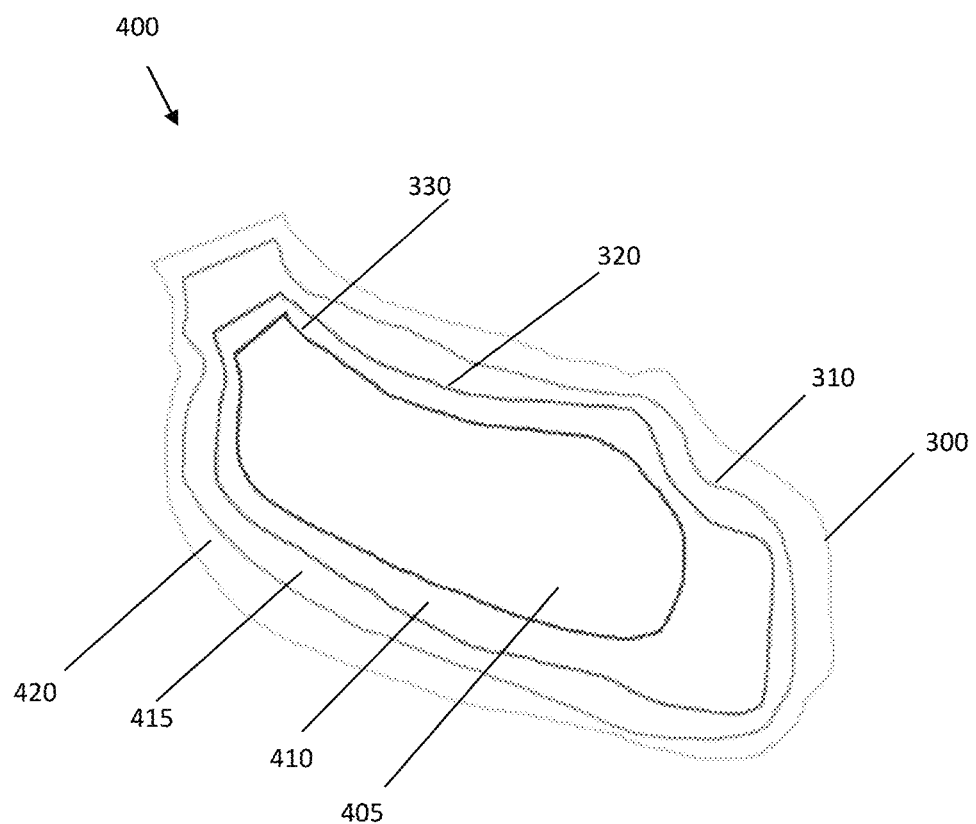
FIG. 4 depicts a superimposed composite image in accordance with some embodiments.

FIG. 4 depicts superimposed composite image 400 in accordance with some embodiments. For purposes of discussion only two frames (FIGS. 3B and 3C) are depicted between the ES and ED frames. However as will be readily understood, there could be more or less frames presented in the composite image. Between each ventricle outline image 300, 310, 320, 330 there are inter-outline regions 410, 415, 420. Additionally, ventricle outline image 300 circumscribes intra-outline region 405.

With reference to FIG. 2, image data unit 200 can include graphic visualization unit 70 in accordance with some embodiments. Graphic visualization unit 70 provides graphic visualization features to the composite image. In accordance with implementations, an interactive user interface can be presented on monitor 33. A user can interact with the user interface to select at least a starting graphic feature for the ED frame and an ending graphic feature for the ES frame. Selection of intermediate graphic features for intervening frames of the superimposed composite image can also be selected by the user. In accordance with some embodiments, graphic visualization unit 70 provides the intermediate graphic features based on the ED and ES graphic features. In some implementations, the ED and ES graphic features themselves can be selected by the graphic visualization unit without receiving a selection from the user.

In accordance with some embodiments, graphic visualization unit 70 can assign a first color for the ED ventricle outline image frame grab and a second color for the ES ventricle outline image frame grab. The assigned colors can be based on user input in accordance with some implementations. A first color for the ED ventricle outline image can be expressed as RGB=(R1, G1, B1), and a second color for the ES ventricle outline image can be expressed as RGB=(RN, GN, BN), where there are N ventricle outline images of the cardiac cycle depicted in the superimposed composite image frame (FIG. 4). The intermediary ventricle wall outline images can have colors assigned that interpolate along the color spectrum based on the position of the intermediary ventricle wall outline image's position in the composite image. In accordance with some embodiments, for any ventricle outline image X, the RGB color of a ventricle outline X can be expressed by Equation 1:

$$RGB(X)=(((N-X)*R1+(X-1)*RN)/(N-1),((N-X)*G1+(X-1)*GN)/(N-1),((N-X)*B1+(X-1)*BN)/(N-1)) \quad (EQ.\ 1)$$

where N=the number of ventricle outline images; and X=the ventricle outline image number.

By way of example, suppose for ED ventricle wall outline image 300 an eight bit RGB=(R1,G1,B1) of red is assigned. Also, suppose for ES ventricle wall outline image 330 an eight bit RGB=(R4,G4,B4) of blue is assigned. Then in accordance with an implementation, the ventricle wall outline images can be colored as follows:

ED ventricle wall outline image 300: RGB(255,0,0);

Intermediary ventricle wall outline image 310: RGB(*255/3,0,255/3) or RGB(170,0,85);

Intermediary ventricle wall outline image 320: RGB(255/3,0, 2*255/3) or RGB(85,0,170); and ED ventricle wall outline image 330: RGB(0,0,255).

The variation in color of the ventricle wall outline images is depicted in FIG. 4 as varying shades of gray, where ED ventricle wall outline 300 is the darkest and ES ventricle wall outline 330 is the lightest.

In accordance with some embodiments, pixels in inter-outline regions 410, 415, 420 can also be presented in color. Additionally, intra-region 405 can also be presented in color. In accordance with some implementations, the color assigned to these inter-outline regions can be progressively shaded based on an interpolation between the ventricle wall outline images that circumscribe the inter-outline region. This interpolation can account for the positioning of a pixel within the inter-outline image in relation to its distance from each of the circumscribing ventricle wall outline images. Based on the pixel positioning, a color can be assigned.

By way of example, suppose ventricle wall outline image X is assigned RGB=(RX,GX,BX) and adjacent ventricle wall outline image X+1 is assigned RGB=(RY,BY,BY). Further, a pixel in the inter-outline region has a first distance DX from outline image X, and a second distance DY from outline image X+1. In accordance with some embodiments, this pixel would be assigned a color expressed by Equation 2:

$$RGB=(DY*RX+DX*RY)/(DX+DY),(DY*GX+DX*GY)/(DX+DY),(DY*BX+DX*BY)/(DX+DY) \quad (EQ.\ 2)$$

If a pixel located in inter-outline region 415 is six pixels from ventricle wall outline image 320 and is nine pixels from ventricle wall outline image 310, then the assigned color for this pixel can be expressed as:

$$RGB=(9*170+6*85)/(6+9),(9*0+6*0)/(6+9),(9*85+6*170)/(6+9)$$

or $$RGB=(136,0,119)$$

where DY=9; DX=6; RX=170; GX=0; BX=85; RY=85; GY=0; and BY=170.

In accordance with some embodiments, special cases of a point lying between more than one pair of adjacent contours can be addressed during the interpolation. For example, if the ED outline image and the ES outline image are mis-identified. If a cardiac cycle includes the four outline images depicted in FIG. 3, but ventricle wall outline image 320 and ventricle wall outline image 330 are interchanged. Naturally, it is well understood that the smallest ventricle volume is the ES frame. However with this interchange of outline images, there can be some points between ventricle wall outline image 310 and ventricle wall outline image 320 that can also be between the interchanged outline images. In such a case where some pixels are located between two pairs of adjacent ventricle wall outlines, these pixels can be assigned two colors by graphic visualization unit 70.

Figure 5:
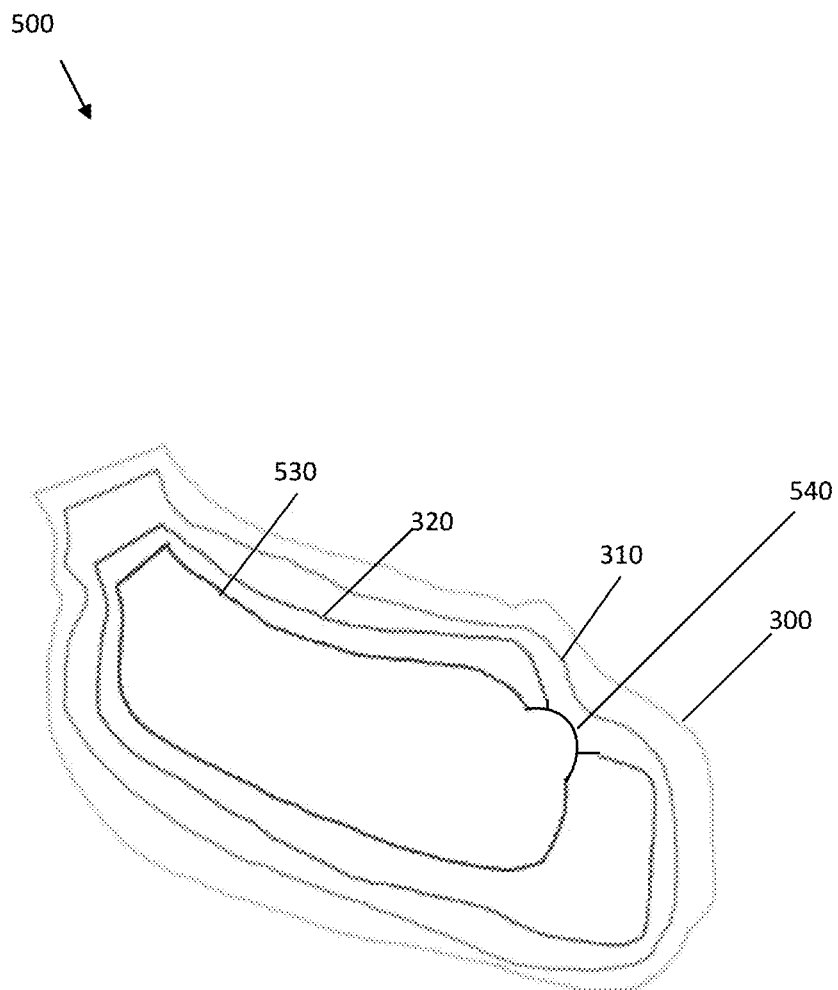
FIG. 5 depicts another superimposed composite image in accordance with some embodiments.

Also, one or more pixels can be assigned multiple colors if the cardiac wall is misidentified by vision unit 50, or if there is some actual irregular movement in the cardiac wall in one or more of the grabbed frame images. FIG. 5 depicts superimposed composite image 500 in accordance with some embodiments. The cardiac cycle depicted in composite image 500 includes ventricle wall outline images 300, 310, 320 plus ventricle wall outline image 530. Due to the perturbation in ventricle wall outline image 530, a portion 540 of the wall outline will cross through outline 320, and there will be some pixels in the inter-outline region that will be between ventricle wall outline images 320, 530 and ventricle wall outline image 310, 530.

In accordance with some implementations, this special case can be addressed with one of three options. First, the color assignment can be given based on the earliest time in the cardiac cycle. Second, the color can be assigned based on the latest time in the cardiac cycle. Third, a different color can be assigned to highlight the pixels of the crossover region.

Figure 6A:
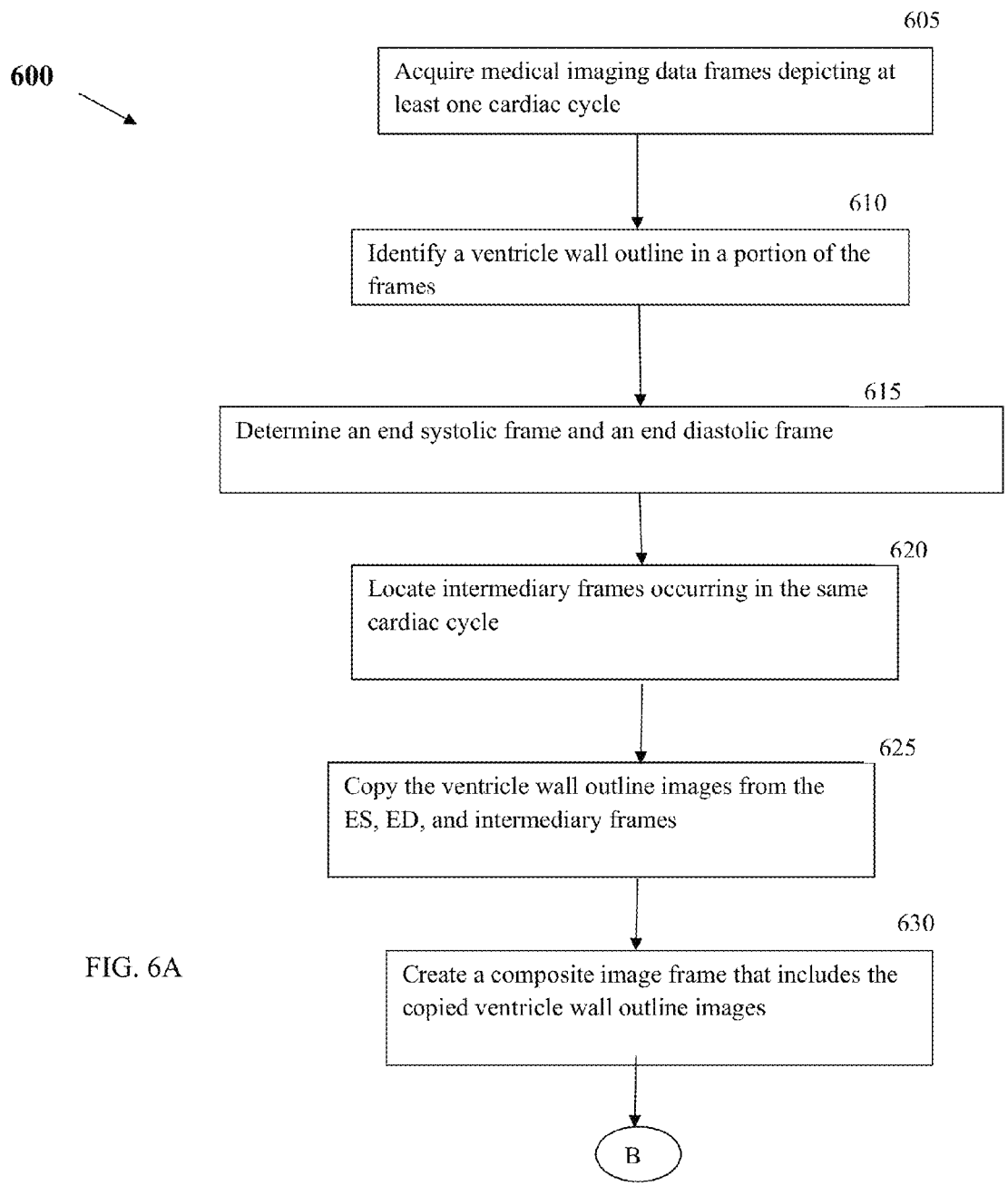
FIGS. 6A-6B depicts a process in accordance with some embodiments.
Figure 6B:
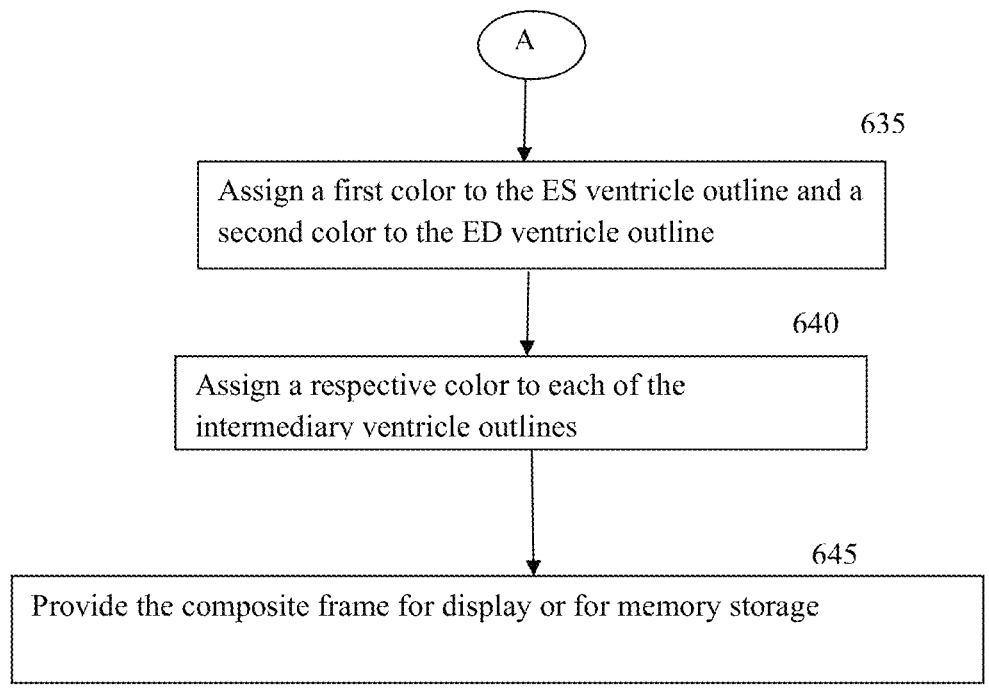

FIGS. 6A-6B depicts process 600 for providing graphic visualization of ventricle wall motion in medical imaging frames in accordance with some embodiments. Medical imaging data frames depicting at least one cardiac cycle are acquired, step 605, from a medical imaging system. The vision unit of an image data unit identifies, step 610, a ventricle wall outline in at least a portion of the acquired images frames. An ES frame and an ED frame are determined, step 615, from the identified ventricle wall outline images. Intermediary frames occurring in the same cardiac cycle defined by the ES and ED frames are located, step 620. The ventricle wall outlines from the ES, ED and intermediary frames are copied by a frame grabber unit, step 625. The frame grabber unit creates, step 630, a composite image frame that is a superposition of the copied ventricle wall outline images. A first color and a second color are respectively assigned, step 635, to the ES and ED ventricle wall outlines. Respective colors are assigned, step 640, to each of the intermediary ventricle outlines of the composite image. The composite frame is provided, step 645, for display, printing, and/or storage in memory.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method providing graphic visualization of ventricle wall motion, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of graphic visualization of ventricle wall motion, the method comprising:
   acquiring medical imaging data depicting at least one cardiac cycle, the medical imaging data including a plurality of image frames;
   identifying a ventricle wall outline in at least a portion of the plurality of image frames;
   determining an end systolic (ES) frame and an end diastolic (ED) frame belonging to a same cardiac cycle from among the identified ventricle wall outlines;
   copying the ventricle wall outline image from the ES frame and the ED frame;
   creating a superimposed composite image frame that includes the copied ventricle wall outline images;
   assigning a first color to the ES outline image and a second color to the ED outline image of the composite frame; and
   providing the composite frame for at least one of displaying, printing, and storing in memory.

2. The method of claim 1, including:
   locating intermediary frames occurring in the same cardiac cycle between the ES frame and the ED frame;
   copying the ventricle wall outline image from the intermediary frames to the composite frame; and
   assigning a respective color to each of the intermediary outline images of the composite frame.

3. The method of claim 1, the identifying step including manually marking points on a ventricle wall outline image.

4. The method of claim 1, the determining step including correlating one or more frames of the plurality of frames with an electrocardiograph recording obtained simultaneously with the medical imaging data.

5. The method of claim 2, the assigning a respective color step including interpolating each respective color to be between the first color and the second color, the interpolation based on a respective position of each intermediary outline image of the composite image.

6. The method of claim 1, including assigning a color to each inter-outline region of the composite frame.

7. The method of claim 6, including progressively shading the inter-outline region color based on the respective colors assigned to respective intermediary frames bordering a respective inter-outline region.

8. A non-transitory computer-readable medium having stored thereon instructions which when executed by a processor cause the processor to perform a method of graphic visualization of ventricle wall motion, the method comprising:
   acquiring medical imaging data depicting at least one cardiac cycle, the medical imaging data including a plurality of image frames;
   identifying a ventricle wall outline in at least a portion of the plurality of image frames;
   determining an end systolic (ES) frame and an end diastolic (ED) frame belonging to a same cardiac cycle from among the identified ventricle wall outlines;
   copying the ventricle wall outline image from the ES frame and the ED frame;
   creating a superimposed composite image frame that includes the copied ventricle wall outline images;
   assigning a first color to the ES outline image and a second color to the ED outline image of the composite frame; and
   providing the composite frame for at least one of displaying, printing, and storing in memory.

9. The medium of claim 8, including instructions to cause the processor to perform the steps of:
   locating intermediary frames occurring in the same cardiac cycle between the ES frame and the ED frame;
   copying the ventricle wall outline image from the intermediary frames to the composite frame; and
   assigning a respective color to each of the intermediary outline images of the composite frame.

10. The medium of claim 8, including instructions to cause the processor to perform the identifying step by manually marking points on a ventricle wall outline image.

11. The medium of claim 8, including instructions to cause the processor to perform the determining step by correlating one or more frames of the plurality of frames with an electrocardiograph recording obtained simultaneously with the medical imaging data.

12. The medium of claim 9, including instructions to cause the processor to perform the assigning a respective color step by interpolating each respective color to be between the first color and the second color, the interpolation based on a respective position of each intermediary outline image of the composite image.

13. The medium of claim 8, including instructions to cause the processor to perform the step of assigning a color to each inter-outline region of the composite frame.

14. The medium of claim 13, including instructions to cause the processor to perform the step of progressively shading the inter-outline region color based on the respective colors assigned to respective intermediary frames bordering a respective inter-outline region.

15. A system for graphic visualization of ventricle wall motion, the system comprising:
   an image data unit including a vision unit structured to identify a ventricle wall outline, a frame grabber unit structured to copy at least a portion of an image from an image frame, and a graphic visualization unit structured to provide graphic visualization features to a composite image; and
   a control processor, the control processor configured to execute operating instructions that cause the processor to:
   acquiring medical imaging data depicting at least one cardiac cycle, the medical imaging data including a plurality of image frames;
   identifying a ventricle wall outline in at least a portion of the plurality of image frames;
   determining an end systolic (ES) frame and an end diastolic (ED) frame belonging to a same cardiac cycle from among the identified ventricle wall outlines;

copying the ventricle wall outline image from the ES frame and the ED frame;
creating a superimposed composite image frame that includes the copied ventricle wall outline images;
assigning a first color to the ES outline image and a second color to the ED outline image of the composite frame; and
providing the composite frame for at least one of displaying, printing, and storing in memory.

16. The system of claim 15, including operating instructions to cause the processor to perform the steps of:
locating intermediary frames occurring in the same cardiac cycle between the ES frame and the ED frame;
copying the ventricle wall outline image from the intermediary frames to the composite frame; and
assigning a respective color to each of the intermediary outline images of the composite frame.

17. The system of claim 15, including operating instructions to cause the processor to perform the identifying step by manually marking points on a ventricle wall outline image.

18. The system of claim 15, including operating instructions to cause the processor to perform the determining step by correlating one or more frames of the plurality of frames with an electrocardiograph recording obtained simultaneously with the medical imaging data.

19. The system of claim 16, including operating instructions to cause the processor to perform the assigning a respective color step by interpolating each respective color to be between the first color and the second color, the interpolation based on a respective position of each intermediary outline image of the composite image.

20. The system of claim 15, including operating instructions to cause the processor to perform the step of assigning a color to each inter-outline region of the composite frame.

21. The medium of claim 20, including operating instructions to cause the processor to perform the step of progressively shading the inter-outline region color based on the respective colors assigned to respective intermediary frames bordering a respective inter-outline region.

* * * * *